US011851076B2

(12) United States Patent
Bai et al.

(10) Patent No.: US 11,851,076 B2
(45) Date of Patent: Dec. 26, 2023

(54) DATA PROCESSING DEVICE AND METHOD FOR DRIVING ASSISTING, AND ASSOCIATED STORAGE MEDIUM AND VEHICLE

(71) Applicant: NIO TECHNOLOGY (ANHUI) CO., LTD, Hefei (CN)

(72) Inventors: Jian Bai, Hefei (CN); Yunyue Cai, Hefei (CN); Jianyong Zhang, Hefei (CN); Shaoqing Ren, Hefei (CN); Samir Agrawal, Hefei (CN); Luna Chen, Hefei (CN); Mingyin Hu, Hefei (CN); Guoyu Li, Hefei (CN); Jiong Chen, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 359 days.

(21) Appl. No.: 17/153,354

(22) Filed: Jan. 20, 2021

(65) Prior Publication Data
US 2022/0219713 A1 Jul. 14, 2022

(30) Foreign Application Priority Data

Jan. 8, 2021 (CN) .......................... 202110023725.2

(51) Int. Cl.
*B60W 50/029* (2012.01)
*G05B 15/02* (2006.01)

(52) U.S. Cl.
CPC ........... *B60W 50/029* (2013.01); *G05B 15/02* (2013.01); *B60W 2420/42* (2013.01); *B60W 2420/52* (2013.01); *B60W 2556/60* (2020.02)

(58) Field of Classification Search
CPC .......... B60W 50/029; B60W 2556/60; B60W 2420/42; B60W 2420/52; B60W 50/045; B60W 60/0018; B60W 60/00186; B60W 60/0015; B60W 50/00; B60W 50/02; B60W 2050/0005; B60W 2050/0006;
(Continued)

(56) References Cited

U.S. PATENT DOCUMENTS 10,089,195 B2 * 10/2018 Liisberg ................. G06F 11/184
2020/0148218 A1 * 5/2020 Huang ............. B60W 60/00186
2021/0213964 A1 * 7/2021 Kain ................... B60W 50/029
(Continued)

*Primary Examiner* — Jelani A Smith
*Assistant Examiner* — Alyssa Rorie
(74) *Attorney, Agent, or Firm* — Sheridan Ross P.C.

(57) ABSTRACT

The disclosure relates to a data processing device for driving assisting, a data processing method for driving assisting, and associated storage medium and vehicle. The data processing device for driving assisting includes: a data processing system configured to receive and process a plurality of vehicle data; and a processing control system configured to perform degradation control under the condition that the data processing system is degraded, to receive and process the plurality of vehicle data in a degradation mode. The data processing device for driving assisting, the data processing method for driving assisting, and the associated storage medium and vehicle perform reasonable division of processing task and degradation control on the data processing system and the processing control system, thereby under the condition that modules in the data processing device stop operating, other modules can be allocated to take over the task timely and effectively.

16 Claims, 2 Drawing Sheets

(58) Field of Classification Search
CPC .. G05B 15/02; G05D 1/0077; G06F 13/4282; G06F 2213/0026
See application file for complete search history.

(56) References Cited

U.S. PATENT DOCUMENTS

2022/0169270 A1* 6/2022 Wei ................. B60W 50/12
2022/0332331 A1* 10/2022 Ming ................ B60W 50/023
2022/0355809 A1* 11/2022 Ye .................. B60W 50/029

\* cited by examiner

DATA PROCESSING DEVICE AND METHOD FOR DRIVING ASSISTING, AND ASSOCIATED STORAGE MEDIUM AND VEHICLE

CROSS-REFERENCE TO RELATED APPLICATION

This application claims the benefit of Chinese Patent Application No. 202110023725.2 filed Jan. 8, 2021, the entire contents of which are incorporated herein by reference.

FIELD OF THE INVENTION

The disclosure relates to the technical field of intelligent driving. In particular, the disclosure relates to a data processing device for driving assisting, a data processing method for driving assisting, and associated storage medium and vehicle.

BACKGROUND OF THE INVENTION

As the degree of vehicle intelligence increases, driving assisting functions, such as ADAS (Advanced Driving Assistance System), have been incorporated by an increasing number of vehicles. In the development of driving assisting, apparatus such as sensors installed on vehicles are becoming more complex in order to provide users with a more automated, safer, and more convenient driving experience.

Processing the data collected by the apparatus for driving assisting function requires a large amount of operations, and therefore higher demands are brought to the data processing capability of the vehicle. In addition, the safety issue is also an important consideration when designing a vehicle in view of the possibility of a malfunction or partial failure of the module used for the driving assisting function.

SUMMARY OF THE INVENTION

According to one aspect of the invention, there is provided a data processing device for driving assisting. The device comprises: a data processing system configured to receive and process a plurality of vehicle data; and a processing control system configured to perform degradation control under the condition that the data processing system is degraded, to receive and process the plurality of vehicle data in a degradation mode.

As an alternative of or in addition to the above technical solution, in the data processing device for driving assisting in accordance with an embodiment of the invention, the data processing system comprises a first data processing module, a second data processing module, a third data processing module, and a fourth data processing module; wherein the first data processing module and the second data processing module are configured to receive the same first vehicle data and second vehicle data; the third data processing module is configured to receive third vehicle data and the second vehicle data; and the fourth data processing module is configured to receive fourth vehicle data and the second vehicle data.

As an alternative of or in addition to the above technical solution, in the data processing device for driving assisting in accordance with an embodiment of the invention, the first vehicle data is one or more of camera data, global navigation satellite system (GNSS) data, and inertial measurement unit (IMU) data; the second vehicle data is one or more of USS interface data, millimeter-wave radar data, brake control unit (BCU) data and vehicle control unit (VCU) data; the third vehicle data is vehicle gateway data; and the fourth vehicle data is light detection and ranging (LiDAR) data.

As an alternative of or in addition to the above technical solution, in the data processing device for driving assisting in accordance with an embodiment of the invention, the third data processing module is further configured to communicate with a vehicle gateway via a first gateway; and the fourth data processing module is further configured to receive the fourth vehicle data via a second gateway.

As an alternative of or in addition to the above technical solution, in the data processing device for driving assisting in accordance with an embodiment of the invention, the processing control system is further configured to perform the following degradation control: under the condition that either of the first data processing module and the second data processing module stops operating, configuring the other of the first data processing module and the second data processing module to operate as an alternative; under the condition that either of the third data processing module and the fourth data processing module stops operating, configuring the other of the third data processing module and the fourth data processing module to operate as an alternative; under the condition that both of the first data processing module and the second data processing module stop operating, configuring at least one of the third data processing module and the fourth data processing module for the driving assisting; under the condition that both of the third data processing module and the fourth data processing module stop operating, configuring at least one of the first data processing module and the second data processing module for the driving assisting; and under the condition that the first through fourth data processing modules stop operating, performing the driving assisting.

As an alternative of or in addition to the above technical solution, in the data processing device for driving assisting in accordance with an embodiment of the invention, the first vehicle data is transmitted through a gigabit serial multimedia link (GSML) de-serializer; the second vehicle data is transmitted over a vehicle controller area network (CAN); and the third vehicle data and the fourth vehicle data are transmitted over an Ethernet (ETH).

As an alternative of or in addition to the above technical solution, in the data processing device for driving assisting in accordance with an embodiment of the invention, the first data processing module, the second data processing module, the third data processing module and the fourth data processing module are system-on-chip (SoC) and communicate through peripheral component interconnect express (PCIe); and the processing control system is a micro control unit (MCU) or a domain control unit (DCU).

As an alternative of or in addition to the above technical solution, in the data processing device for driving assisting in accordance with an embodiment of the invention, the processing control system is further configured to: transmitting the second vehicle data to individual data processing modules in the data processing system.

As an alternative of or in addition to the above technical solution, the data processing device for driving assisting in accordance with an embodiment of the invention further comprises: a storage module for storing one or more of the first through fourth vehicle data.

According to another aspect of the invention, there is provided a data processing method for driving assisting. The method comprises: receiving and processing, by a data processing system, a plurality of vehicle data; and under the condition that the data processing system is degraded, performing degradation control by a processing control system to receive and process the plurality of vehicle data in a degradation mode.

As an alternative of or in addition to the above technical solution, in the data processing method for driving assisting in accordance with an embodiment of the invention, the data processing system comprises a first data processing module, a second data processing module, a third data processing module, and a fourth data processing module; and the method further comprising: receiving, by the first data processing module and the second data processing module, the same first vehicle data and second vehicle data; receiving, by the third data processing module, third vehicle data and the second vehicle data; and receiving, by the fourth data processing module, fourth vehicle data and the second vehicle data.

As an alternative of or in addition to the above technical solution, in the data processing method for driving assisting in accordance with an embodiment of the invention, the first vehicle data is one or more of camera data, global navigation satellite system (GNSS) data, and inertial measurement unit (IMU) data; the second vehicle data is one or more of USS interface data, millimeter-wave radar data, brake control unit (BCU) data and vehicle control unit (VCU) data; the third vehicle data is vehicle gateway data; and the fourth vehicle data is light detection and ranging (LiDAR) data.

As an alternative of or in addition to the above technical solution, the data processing method for driving assisting in accordance with an embodiment of the invention further comprises: communicating, by the third data processing module, with a vehicle gateway via a first gateway; and receiving, by the fourth data processing module, the fourth vehicle data via a second gateway.

As an alternative of or in addition to the above technical solution, in the data processing method for driving assisting in accordance with an embodiment of the invention, the degradation control comprises: under the condition that either of the first data processing module and the second data processing module stops operating, operating by the other of the first data processing module and the second data processing module as an alternative; under the condition that either of the third data processing module and the fourth data processing module stops operating, operating by the other of the third data processing module and the fourth data processing module as an alternative; under the condition that both of the first data processing module and the second data processing module stop operating, using at least one of the third data processing module and the fourth data processing module for the driving assisting; under the condition that both of the third data processing module and the fourth data processing module stop operating, using at least one of the first data processing module and the second data processing module for the driving assisting; and under the condition that the first through fourth data processing modules stop operating, using the processing control system for the driving assisting.

As an alternative of or in addition to the above technical solution, the data processing method for driving assisting in accordance with an embodiment of the invention further comprises: transmitting the first vehicle data through a gigabit serial multimedia link (GSML) de-serializer; transmitting the second vehicle data over a vehicle controller area network (CAN); and transmitting the third vehicle data and the fourth vehicle data over an Ethernet (ETH).

As an alternative of or in addition to the above technical solution, in the data processing method for driving assisting in accordance with an embodiment of the invention, the first data processing module, the second data processing module, the third data processing module and the fourth data processing module are system-on-chip (SoC) and communicate through peripheral component interconnect express (PCIe); and the processing control system is a micro control unit (MCU) or a domain control unit (DCU).

As an alternative of or in addition to the above technical solution, in the data processing method for driving assisting in accordance with an embodiment of the invention further comprises: receiving, via the processing control system, the second vehicle data by individual data processing modules in the data processing system.

As an alternative of or in addition to the above technical solution, in the data processing method for driving assisting in accordance with an embodiment of the invention further comprises: storing one or more of the first through fourth vehicle data by a storage module.

According to yet another aspect of the invention, there is provided a computer readable storage medium having stored thereon program instructions executable by a processor, and when executed by the processor, performing the data processing method for driving assisting according to any embodiment of one aspect of the invention.

According to yet another aspect of the invention, there is provided a vehicle comprising the data processing device for driving assisting according to any embodiment of one aspect of the invention.

BRIEF DESCRIPTION OF THE DRAWINGS

The above and/or other aspects and advantages of the disclosure will become more apparent and readily understood from the following description taken in conjunction with the accompanying drawings in which like or similar elements are designated by like numerals. In the drawings.

DETAILED DESCRIPTION OF THE EMBODIMENT(S) OF THE INVENTION

Figure 1:
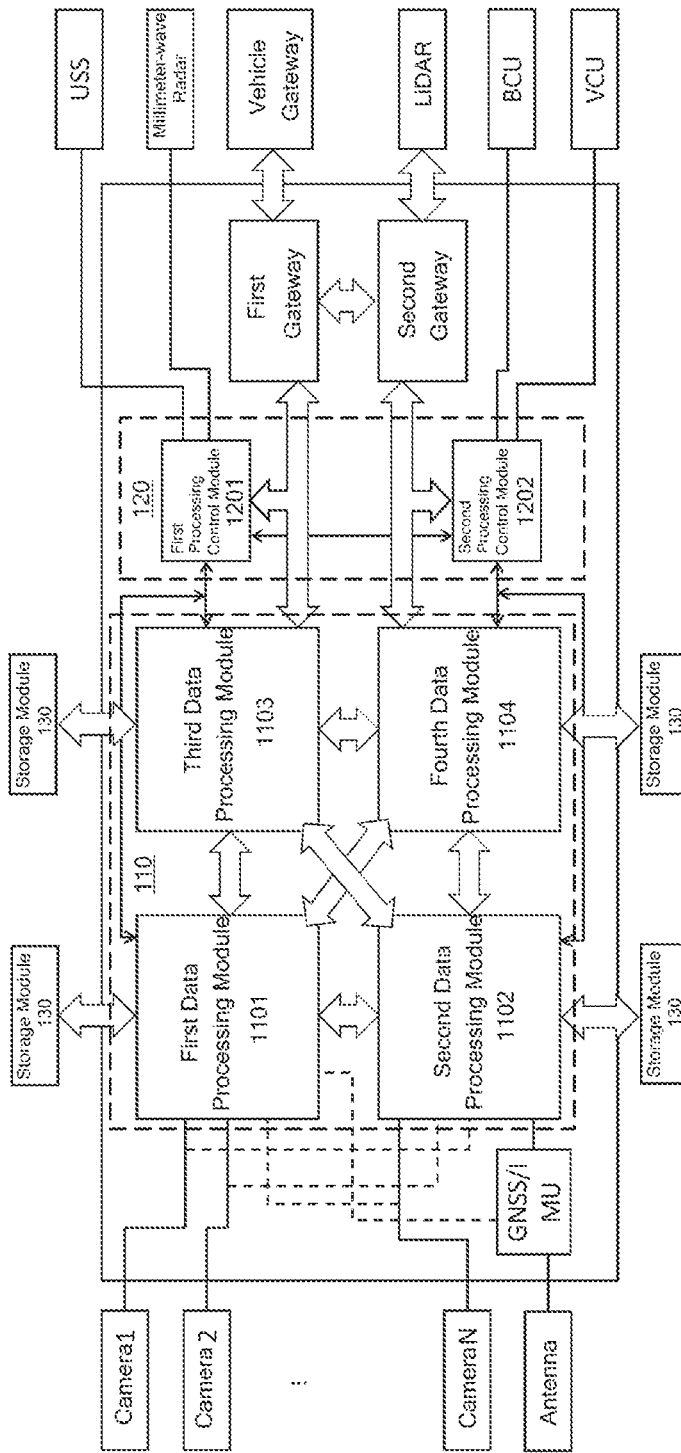
FIG. 1 is a schematic block diagram of the data processing device for driving assisting 100 in accordance with an embodiment of the present invention.

In this specification, the embodiments of the invention will be described more fully with reference to the accompanying drawings, which illustrate exemplary embodiments of the invention. The disclosure may, however, be embodied in many different forms and should not be construed as limited to the embodiments set forth herein. The embodiments are presented so that this disclosure will be thorough and complete, and will fully convey the protective scope of the disclosure to those skilled in the art.

Terms such as "including" and "comprising" mean that, in addition to having elements and steps that are directly and explicitly recited in the specification and claims, the technical solutions of the disclosure do not preclude the situation with other elements and steps that are not directly or explicitly recited. Terms such as "first" and "second" do not denote the order of elements in terms of time, space, size, etc., but are merely used to distinguish one element from another.

The embodiments of the present invention will be described below with reference to flowchart illustrations, block diagrams, and/or flowcharts of method and device in accordance with embodiments of the invention. It will be understood that the flowchart illustrations and/or each block of block diagrams, and combinations of flowchart illustrations and/or block diagrams, may be implemented by computer program instructions. These computer program instructions may be provided to the processor of a general purpose computer, special purpose computer, or other programmable data processing apparatus to construct a machine, so that the instructions, which are executed by the processor of a computer or other programmable data processing apparatus, create components for implementing the functions/operations specified in these flowcharts and/or blocks and/or one or more flow diagrams. It should also be noted that, in some alternative implementations, the functions/operations shown in the blocks may occur in an order other than the order shown in the flowcharts. For example, two blocks shown in succession may, in fact, be executed substantially concurrently or the blocks may sometimes be executed in the reverse order, depending upon the function/operation involved.

Where applicable, various embodiments provided by the present disclosure may be implemented using hardware, software, or a combination of hardware and software. In addition, where applicable, the various hardware components and/or software components set forth herein may be combined into composite components including software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Reference is now made to FIG. 1, FIG. 1 illustrates a schematic block diagram of a data processing device for driving assisting 100 in accordance with an embodiment of the present invention. Modern intelligent vehicle sensor architectures have gradually transitioned from a distributed architecture to a domain centralized architecture in which five domain controllers (or domain control unit, DCU) are typically employed to control the 5 domains of the vehicle, the power domain, the chassis domain, the cabin domain/smart information domain, the automated driving domain, and the body domain. In one embodiment, the device 100 is used in a domain control module of an automated driving domain of an intelligent vehicle for controlling the automated driving domain in a domain centralized intelligent vehicle. In general, by receiving data from various sensors and other parts of the vehicle, as well as processing and analyzing the data, the data processing device for driving assisting 100 performs functions such as perception fusion, planning decision control, mapping positioning, redundancy backup, and the like, such as to provide instructions that can be used for driving assisting.

As shown in FIG. 1, data processing device for driving assisting 100 includes a data processing system 110 and a processing control system 120 respectively shown by the dotted lines in FIG. 1. Wherein, the data processing system 110 may be configured to receive and process a plurality of vehicle data, such as data from various sensors and components on the left and right sides of FIG. 1. The processing control system 120 may be configured to perform a degradation control to receive and process the plurality of vehicle data in a degradation mode under the condition that the data processing system 110 is degraded. Wherein degrading refers to the situation where some or all of the data processing system 110 stops operating for a variety of reasons including, but not limited to, passive degradation caused by a failure, and active degradation for adapting to different vehicle models.

The data processing system 110 may comprise a first data processing module 1101, a second data processing module 1102, a third data processing module 1103, and a fourth data processing module 1104. Where applicable, the third data processing module 1103 and the fourth data processing module 1104 may also be combined into one data processing module. In one embodiment, the first through fourth data processing modules 1101-1104 may be a system-on-chip (SoC). In particular, for the system on a chip (SoC), a chip with large computational capacity, such as the Orin System on Chip (SoC) from NVIDIA Corporation, may be employed, the operating frequency of which may be up to 200 trillion/second. The first through fourth data processing modules 1101-1104 may also perform data communication over a large bandwidth data transmission channel, for example, through peripheral component interconnect express (PCIe), for interconnection. The data processing system 110 may also be configured to store the various received data to one or more storage modules 130 for possible future use.

The processing control system 120 may be a conventional micro control unit (MCU), and may also be a domain controller in the domain control module described above. The domain controller is also referred to as a domain control unit (DCU). Compared with the data processing system 110, the computational capacity of the processing control system 120 is weaker, and can typically perform data processing of conventional type and with conventional computation amount. Two processing control modules 1201 and 1202 in the processing control system 120 are shown in FIG. 1, but more or fewer processing control modules are possible. Communication may be performed between the plurality of processing control modules in the processing control system 120, for example, via a vehicle controller area network (CAN).

The processing control system 120 is configured to receive the second vehicle data, and then transmit the second vehicle data to the various data processing modules in the data processing system 110 after format conversion or regular processing on the content of the second vehicle data. The second vehicle data is typically conventional vehicle sensor data, including but not limited to universal serial interface (USS) data, millimeter-wave radar data, brake control unit (BCU) data, and vehicle control unit (VCU) data. These conventional vehicle sensor data have been commonly used for vehicle control, and may be received and processed directly by the processing control system 120 due to the properties (e.g., small amount, simple operation, and the like) of conventional vehicle sensor data. As such, the second vehicle data may generally be transmitted using the vehicle CAN.

Continue referring to FIG. 1, a more detailed illustration of the data processing device for driving assisting 100, in particular the data processing system 110, is conducted. As described above, the data processing system 110 may comprise a first data processing module 1101, a second data processing module 1102, a third data processing module 1103, and a fourth data processing module 1104. In one embodiment, the first data processing module 1101 and the second data processing module 1102 may be configured to receive the same first vehicle data and the second vehicle data as described above. The first vehicle data includes, but is not limited to, camera data, global navigation satellite system (GNSS) data, and inertial measurement unit (IMU) data. Wherein the GNSS data can be obtained from the outside through the on-board antenna, and the GNSS data mainly comprises positioning data of the object where the equipment used for receiving GNSS data is located, and velocity data, direction data and the like can be obtained with simple calculation on the original GNSS data.

As shown in FIG. 1, in case that N cameras of camera 1, camera 2, . . . , camera N are mounted on the vehicle, the camera data can be data from N cameras. For example, the camera may be mounted at the front, rear, and sides of the vehicle and may have a different imaging field of view of 60, 120, 180 degrees, etc. The first data processing module 1101 and the second data processing module 1102 may perform fusion processing on the first vehicle data (e.g., camera data from the plurality of cameras), including pre-processing, correction, alignment, association, importance evaluation, prediction, and the like, for driving assisting functions.

As the camera is typically connected with the first and second data processing modules 1101, 1102 by means such as a de-serializer (e.g., gigabit serial multimedia link (GSML) de-serializer) to perform the generation of camera synchronization signals and the like, the connection it is relatively cumbersome. Thus, in the present embodiment, camera data may be provided to the first data processing module 1101 and the second data processing module 1102 for backup, without being provided to the third data processing module 1103 and the fourth data processing module 1104, to achieve a compromise between system complexity, operation complexity, data latency, cost and backup effects as well as driving safety. However, the technical solution of connecting all vehicle data to individual data processing modules is not precluded.

In one embodiment, a particular task division of data processing is performed on the third data processing module 1103 and the fourth data processing module 1104. For example, the third data processing module 1103 is configured to receive the third vehicle data such as vehicle gateway data, and the second vehicle data described above, and may communicate and interact with the vehicle gateway via the first gateway, for example. The fourth data processing module 1104 is configured to receive the fourth vehicle data (e.g., light detection and ranging (LiDAR) data) and the second vehicle data as described above, e.g., via a second gateway. In other words, from the view of the vehicle data, the second vehicle data including conventional vehicle sensor data is actually sent over the CAN bus to each of the first through fourth data processing modules 1101-1104 in the data processing system 110, and is to the processing control system 120, and the data is interchangeable between the various modules in the data processing system 110 and the processing control system 120. Therefore, whenever any module of the data processing system 110 and the processing control system 120 is able to operate, at least the second vehicle data can be received and processed under the condition of degradation in order to realize the basic driving assisting function, ensuring vehicle safety to a certain extent. The operations during degradation will be described in detail below.

In addition, communication and data exchange may also occur between the first gateway and the second gateway. Due to the large data volume of the vehicle gateway data and the LiDAR data, the use of Ethernet (ETH) is more suitable for transferring such data between the first gateway, the second gateway, the processing control system 120, and the data processing system 110, enabling faster data transfer.

Next, the degradation control will be described. When any one or more modules in the data processing system 110 or the processing control system 120 stop operating due to failure, or when one or more of the modules described above is configure not to operate for adapting the different vehicle models, degradation happens.

Degradation Control 1 (Degradation Mode 1): under the condition that either of the first data processing module 1101 and the second data processing module 1102 stops operating, configuring the other of the first data processing module 1101 and the second data processing module 1102 to operate as an alternative. As described above, the first data processing module 1101 and the second data processing module 1102 are input with the same vehicle data, including the first vehicle data and the second vehicle data, so both modules are consistent in data type and data amount. Typically, the contents of the first and second data processing modules 1101, 1102 remain consistent, but only one of them performs data processing work; when the working data processing module stops working, another processing module can be initiated timely to take over the data processing task, for example, so as to enable the fusion operation on the camera data to proceed. Thus, normal operation of the functions utilizing processing results of the camera data can be ensured.

Degradation Control 2 (Degradation Mode 2): under the condition that either of the third data processing module 1103 and the fourth data processing module 1104 stops operating, configuring the other of the third data processing module and the fourth data processing module to operate as an alternative. In one aspect, according to the foregoing, the third data processing module 1103 is configured to receive the second vehicle data and to communicate with the vehicle gateway; and the fourth data processing module 1104 is configured to receive second vehicle data and receive LiDAR data, thus, similar to the first data processing module 1101 and the second data processing module 1102, when either of the third and fourth data processing modules 1103, 1104 stops operating, the other of the two may be utilized to continue to work, e.g., millimeter-wave radar data, BCU data, VCU data, and the like may be utilized to realize basic driving assisting functions. When either of the third and fourth data processing modules 1103, 1104 stops operating, the data of the two processing control modules 1201 and 1202 may also be input to the other data processing module, whereby each of the second through fourth vehicle data may be processed and utilized.

On the other hand, unlike the first and second data processing modules 1101, 1102, in addition to the second vehicle data, the third data processing module 1103 also communicates with the vehicle gateway through the first gateway, and the fourth data processing module 1104 also receives LiDAR data through the second gateway. Although data transfer may occur between the first gateway and the second gateway, e.g., via Ethernet (ETH), the third and fourth data processing modules 1103, 1104 may also preferably process the data it receives directly, only transferring necessary data through the gateway, thereby reducing operation complexity.

Degradation Control 3 (Degradation Mode 3): under the condition that both of the first data processing module 1101 and the second data processing module 1102 stop operating, configuring at least one of the third data processing module 1103 and the fourth data processing module 1104 for the driving assisting. As described above, for the compromise of several aspects, the first vehicle data may be input to the first and second data processing modules 1101, 1102, thus, it may be impossible to continue utilizing the first vehicle data when neither of the first and second data processing modules 1101, 1102 is operating. At this point, one or more of the third and fourth data processing modules 1103, 1104 may be utilized to continue providing data processing support for the driving assisting functions. For example, where both the third and fourth data processing modules 1103, 1104 are functioning properly, one or both of the second through fourth vehicle data input thereto (e.g., LiDAR data and millimeter-wave radar data) may be analyzed and processed using the both. Where only the third data processing module 1103 is used, it may be configured to process only the second and third vehicle data directly input to it, or it may also be configured process the fourth vehicle data transmitted via the Ethernet. Similarly, where only the fourth data processing module 1104 is used, it may be configured to process only the second and fourth vehicle data directly input to it, or it may also be configured to process the third vehicle data transmitted via the Ethernet. In addition, in the event that the hardware processing capability is insufficient, only the second vehicle data may be processed to realize the basic driving assisting function.

Degradation Control 4 (Degradation Mode 4): under the condition that both of the third data processing module 1103 and the fourth data processing module 1104 stop operating, configuring at least one of the first data processing module 1101 and the second data processing module 1102 for the driving assisting. Where neither of the third and fourth data processing modules 1103 and 1104 operate, one or both of the first and second data processing modules 1101, 1102 may be utilized to continue providing data processing support for the driving assisting functions. For example, as described above, the input first and second vehicle data may be analyzed and processed using one of the first and second data processing modules 1101, 1102 when the two both operate normally. When one of the first and second data processing modules 1101, 1102 is not operating, the other may be used to take over the work of the module not operating. In one embodiment, the first and second data processing modules 1101, 1102 may only process one of the first and second vehicle data for driving assisting functions.

Degradation Control 5 (Degradation Mode 5): under the condition that the first through fourth data processing modules 1101-1104 stop operating, the processing control system 120 performs the driving assisting. Due to the use of at least one millimeter-wave radar and one MCU in conventional driving assisting may realize the basic driving assisting functions (e.g., basic automatic car following function and the like), the processing control system 120 may be used for a more basic driving assisting function when the whole data processing system 110 stops operating.

Five degradation control operations are listed herein, but different degradation controls may be employed depending on different configurations of the vehicle's automated driving domain and different needs, and are not limited to the five control methods described above.

Figure 2:
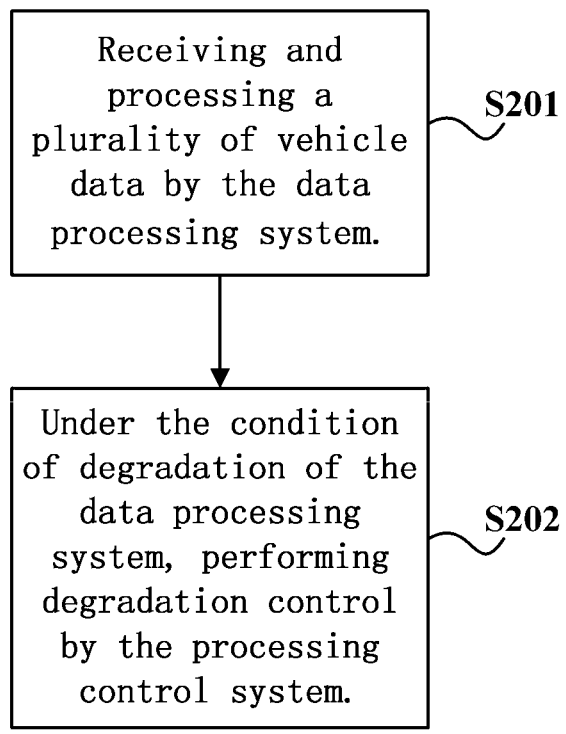
FIG. 2 is a flowchart of a data processing method for driving assisting 200 in accordance with an embodiment of the present invention.

Next, a data processing method for driving assisting 200 is described with reference to FIG. 2. FIG. 2 illustrates a flowchart of the data processing method for driving assisting 200 in accordance with an embodiment of the present invention.

The method 200 according to one or more embodiments of the present invention may be used for domain control of an automated driving domain of an intelligent vehicle. In general, in the data processing method for driving assisting 200, by receiving data from various sensors and other parts of the vehicle, as well as processing and analyzing the data, functions such as perception fusion, planning decision control, mapping positioning, redundancy backup, and the like, may be realized to provide instructions that can be used for driving assisting.

In step S201, a plurality of vehicle data, such as data from various sensors and components, may be received and processed by the data processing system 110. In step S202, in the event of degradation of the data processing system 110, degradation control may be performed by the processing control system 120 to receive and process the plurality of vehicle data in a degradation mode.

The data processing system 110 may comprise a first data processing module 1101, a second data processing module 1102, a third data processing module 1103, and a fourth data processing module 1104. Where applicable, the third data processing module 1103 and the fourth data processing module 1104 may also be combined into one data processing module. The first through fourth data processing modules 1101-1104 may also be made perform data communication over a large bandwidth data transmission channel, for example, through peripheral component interconnect express (PCIe), for interconnection. The method 200 further comprises storing the various received data to one or more storage modules 130 for possible future use.

The processing control system 120 may be utilized to receive the second vehicle data, and then transmit the second vehicle data to the various data processing modules in the data processing system 110 after format conversion or regular processing on the content of the second vehicle data. The second vehicle data is typically conventional vehicle sensor data, including but not limited to universal serial interface (USS) data, millimeter-wave radar data, brake control unit (BCU) data, and vehicle control unit (VCU) data. The second vehicle data may be received and processed directly utilizing the processing control system 120, and the second vehicle data may generally be transmitted using the vehicle CAN. The method 200 may further comprise communicating between multiple processing control modules in the processing control system 120, for example, through the vehicle CAN.

The data processing system 110 may comprise a first data processing module 1101, a second data processing module 1102, a third data processing module 1103, and a fourth data processing module 1104. In step S201, the first data processing module 1101 and the second data processing module 1102 may be utilized to receive the same first vehicle data and the second vehicle data as described above. The first vehicle data includes, but is not limited to, camera data, global navigation satellite system (GNSS) data, and inertial measurement unit (IMU) data. Wherein the GNSS data may be obtained from the outside through the on-board antenna, and the GNSS data mainly comprises positioning data of the object where the equipment used for receiving GNSS data is located. Velocity data, direction data and the like can be obtained with simple calculation on the original GNSS data.

In case that N cameras of camera 1, camera 2, . . . , camera N are mounted on the vehicle, the camera data can be data from N cameras. For example, the camera may be mounted at the front, rear, and sides of the vehicle and may have a different imaging field of view of 60, 120, 180 degrees, etc. The first data processing module 1101 and the second data processing module 1102 may be utilized to perform fusion processing on the first vehicle data (e.g., camera data from the plurality of cameras), including pre-processing, correction, alignment, association, importance evaluation, prediction, and the like, for driving assisting functions.

As typically means such as a de-serializer (e.g., gigabit serial multimedia link (GSML) de-serializer) is required to connect the camera with the first and second data processing modules 1101, 1102 to perform the generation of camera synchronization signals and the like, the connection it is relatively cumbersome. Thus, in the present embodiment, camera data may be provided to the first data processing module 1101 and the second data processing module 1102 for backup, without being provided to the third data processing module 1103 and the fourth data processing module 1104, to achieve the compromise between system complexity, operation complexity, data latency, cost and backup effects as well as driving safety. However, the technical solution of connecting all vehicle data to individual data processing modules is not precluded.

In one embodiment, a particular task division of data processing is performed on the third data processing module 1103 and the fourth data processing module 1104. For example, the third data processing module 1103 may be utilized in step S201 to receive the third vehicle data such as vehicle gateway data, and the second vehicle data described above, and may communicate and interact with the vehicle gateway via the first gateway, for example. The fourth data processing module 1104 may be utilized in step S201 to receive the fourth vehicle data (e.g., light detection and ranging (LiDAR) data) and the second vehicle data as described above, e.g., via a second gateway. In other words, from the view of the vehicle data, the second vehicle data including conventional vehicle sensor data is actually sent over the CAN bus to each of the first through fourth data processing modules 1101-1104 in the data processing system 110, and is to the processing control system 120, and the data is interchangeable between the various modules in the data processing system 110 and the processing control system 120. Therefore, whenever any one module of the data processing system 110 and the processing control system 120 is able to operate, at least the second vehicle data can be received and processed under the condition of degradation in order to realize the basic driving assisting function, ensuring vehicle safety to a certain extent. The operations during degradation will be described in detail below.

In addition, communication and data exchange may also be performed between the first gateway and the second gateway. Due to the large data volume of the vehicle gateway data and the LiDAR data, the use of Ethernet (ETH) for transferring such data between the first gateway, the second gateway, the processing control system 120, and the data processing system 110 enables faster data transfer.

Next, the degradation control will be described. When any one or more modules in the data processing system 110 or the processing control system 120 stop operating due to failure, or when one or more of the modules described above is configure not to operate for adapting the different vehicle models, degradation happens. Under the condition of degradation, in step S202, the following degradation control may be performed.

Degradation Control 1 (Degradation Mode 1): under the condition that either of the first data processing module 1101 and the second data processing module 1102 stops operating, operating by the other of the first data processing module 1101 and the second data processing module 1102 as an alternative. As described above, the first data processing module 1101 and the second data processing module 1102 are input with the same vehicle data, including the first vehicle data and the second vehicle data, so both modules are consistent in data type and data amount. Typically, the contents of the first and second data processing modules 1101, 1102 remain consistent, but only one of them is used to perform data processing work; when the working data processing module stops working, another processing module can be initiated timely to take over the data processing task, for example, so as to enable the fusion operation on the camera data to proceed. Thus, normal operation of the functions utilizing processing results of the camera data can be ensured.

Degradation Control 2 (Degradation Mode 2): under the condition that either of the third data processing module 1103 and the fourth data processing module 1104 stops operating, operating by the other of the third data processing module and the fourth data processing module as an alternative. In one aspect, according to the foregoing, the third data processing module 1103 is configured to receive the second vehicle data and to communicate with the vehicle gateway; and the fourth data processing module 1104 is configured to receive second vehicle data and receive LiDAR data, thus, similar to the first data processing module 1101 and the second data processing module 1102, when either of the third and fourth data processing modules 1103, 1104 stops operating, the other of the two may be utilized to continue to work, e.g., millimeter-wave radar data, BCU data, VCU data, and the like may be utilized to realize basic driving assisting functions. When either of the third and fourth data processing modules 1103, 1104 stops operating, the data of the two processing control modules 1201 and 1202 may also be input to the other data processing module, whereby each of the second through fourth vehicle data may be processed and utilized.

On the other hand, unlike the first and second data processing modules 1101, 1102, in addition to the second vehicle data, the third data processing module 1103 also communicates with the vehicle gateway through the first gateway, and the fourth data processing module 1104 also receives LiDAR data through the second gateway. Although data transfer may occur between the first gateway and the second gateway, e.g., via Ethernet (ETH), the third and fourth data processing modules 1103, 1104 may also preferably process the data it receives directly, only transferring necessary data through the gateway, thereby reducing operation complexity.

Degradation Control 3 (Degradation Mode 3): under the condition that both of the first data processing module 1101 and the second data processing module 1102 stop operating, configuring at least one of the third data processing module 1103 and the fourth data processing module 1104 for the driving assisting. As described above, for the compromise of several aspects, the first vehicle data may be input to the first and second data processing modules 1101, 1102, thus, it may be impossible to continue utilizing the first vehicle data when neither of the first and second data processing modules 1101, 1102 is operating. At this point, one or more of the third and fourth data processing modules 1103, 1104 may be utilized to continue providing data processing support for the driving assisting functions. For example, where both the third and fourth data processing modules 1103, 1104 are functioning properly, one or both of the second through fourth vehicle data input thereto (e.g., LiDAR data and millimeter-wave radar data) may be analyzed and processed using the both. Where only the third data processing module 1103 is used, it may be configured to process only the second and third vehicle data directly input to it, or it may also be configured process the fourth vehicle data transmitted via the Ethernet. Similarly, where only the fourth data processing module 1104 is used, it may be configured to process only the second and fourth vehicle data directly input to it, or it may also be configured to process the third vehicle data transmitted via the Ethernet. In addition, in the event that the hardware processing capability is insufficient, only the second vehicle data may be processed to realize the basic driving assisting function.

Degradation Control 4 (Degradation Mode 4): under the condition that both of the third data processing module 1103 and the fourth data processing module 1104 stop operating, configuring at least one of the first data processing module 1101 and the second data processing module 1102 for the driving assisting. Where neither of the third and fourth data processing modules 1103 and 1104 operate, one or both of the first and second data processing modules 1101, 1102 may be utilized to continue providing data processing support for the driving assisting functions. For example, as described above, the input first and second vehicle data may be analyzed and processed using one of the first and second data processing modules 1101, 1102 when the two both operate normally. When one of the first and second data processing modules 1101, 1102 is not operating, the other may be used to take over the work of the module not operating. In one embodiment, the first and second data processing modules 1101, 1102 may only process one of the first and second vehicle data for driving assisting functions.

Degradation Control 5 (Degradation Mode 5): under the condition that the first through fourth data processing modules 1101-1104 stop operating, using the processing control system 120 for the driving assisting. Due to the use of at least one millimeter-wave radar and one MCU in conventional driving assisting may realize the basic driving assisting functions (e.g., basic automatic car following function and the like), the processing control system 120 may be used for a more basic driving assisting function when the whole data processing system 110 stops operating.

Although five degradation control operations are listed herein, different degradation controls may be employed depending on different configurations of the vehicle's automated driving domain and different needs, and are not limited to the five control methods described above.

According to yet another aspect of the invention, there is provided a computer readable storage medium having stored thereon program instructions executable by a processor that, when executed by the processor, perform the data processing method for driving assisting 200 in accordance with any embodiment of one aspect of the present invention.

According to yet another aspect of the invention, there is provided a vehicle comprising the data processing device for driving assisting 100 in accordance with any embodiment of one aspect of the present invention.

The foregoing disclosure is not intended to limit the present disclosure to the precise form disclosed or to the particular field of use. Therefore, it is contemplated that various alternative embodiments and/or modifications of the disclosure are possible in light of the present disclosure, whether explicitly described or implied herein. Having thus described embodiments of the present disclosure, those of ordinary skill in the art will recognize that changes may be made in form and detail without departing from the scope of the present disclosure. Accordingly, the present disclosure is limited only by the claims.

What is claimed is:

1. A data processing device for driving assisting, comprising:
 a data processing system configured to receive and process a plurality of vehicle data, wherein the data processing system comprises a first data processing processor, a second data processing processor, a third data processing processor, and a fourth data processing processor; wherein the first data processing processor and the second data processing processor are configured to receive a same first vehicle data and second vehicle data; the third data processing processor is configured to receive third vehicle data and the second vehicle data; and the fourth data processing processor is configured to receive fourth vehicle data and the second vehicle data; and
 a processing control processor configured to perform degradation control under the condition that the data processing system is degraded, to receive and process the plurality of vehicle data in a degradation mode, and wherein the processing control processor is further configured to perform the following degradation control:
 under the condition that either of the first data processing processor and the second data processing processor stops operating, configuring the other of the first data processing processor and the second data processing processor to operate as an alternative;
 under the condition that either of the third data processing processor and the fourth data processing processor stops operating, configuring the other of the third data processing processor and the fourth data processing processor to operate as an alternative;
 under the condition that both of the first data processing processor and the second data processing processor stop operating, configuring at least one of the third data processing processor and the fourth data processing processor for the driving assisting;
 under the condition that both of the third data processing processor and the fourth data processing processor stop operating, configuring at least one of the first data processing processor and the second data processing processor for the driving assisting; and
 under the condition that the first through fourth data processing processors stop operating, performing the driving assisting.

2. The device of claim 1, wherein,
the first vehicle data is one or more of camera data, global navigation satellite system (GNSS) data, and inertial measurement unit (IMU) data;
the second vehicle data is one or more of USS interface data, millimeter-wave radar data, brake control unit (BCU) data and vehicle control unit (VCU) data;
the third vehicle data is vehicle gateway data; and
the fourth vehicle data is light detection and ranging (LiDAR) data.

3. The device of claim 1, wherein,
the third data processing processor is further configured to communicate with a vehicle gateway via a first gateway; and
the fourth data processing processor is further configured to receive the fourth vehicle data via a second gateway.

4. The device of claim 1, wherein,
the first vehicle data is transmitted through a gigabit serial multimedia link de-serializer;
the second vehicle data is transmitted over a vehicle controller area network (CAN); and
the third vehicle data and the fourth vehicle data are transmitted over an Ethernet.

5. The device of claim 1, wherein,
the first data processing processor, the second data processing processor, the third data processing processor and the fourth data processing processor are system-on-chip (SoC) and communicate through peripheral component interconnect express; and
the processing control processor is a micro control unit (MCU) or a domain control unit (DCU).

6. The device of claim 1, wherein the processing control processor is further configured to:
transmitting the second vehicle data to individual data processing processors in the data processing system.

7. The device of claim 1, further comprising:
a storage module for storing one or more of the first through fourth vehicle data.

8. A data processing method for driving assisting, comprising: receiving and processing, by a data processing system, a plurality of vehicle data, wherein the data processing system comprises a first data processing processor, a second data processing processor, a third data processing processor, and a fourth data processing processor; which comprises:
receiving, by the first data processing processor and the second data processing processor, a same first vehicle data and second vehicle data;
receiving, by the third data processing processor, third vehicle data and the second vehicle data; and
receiving, by the fourth data processing processor, fourth vehicle data and the second vehicle data; and
under the condition that the data processing system is degraded, performing degradation control by a processing control processor to receive and process the plurality of vehicle data in a degradation mode, wherein the degradation control comprises:
under the condition that either of the first data processing processor and the second data processing processor stops operating, operating by the other of the first data processing processor and the second data processing processor as an alternative;
under the condition that either of the third data processing processor and the fourth data processing processor stops operating, operating by the other of the third data processing processor and the fourth data processing processor as an alternative;
under the condition that both of the first data processing processor and the second data processing processor stop operating, using at least one of the third data processing processor and the fourth data processing processor for the driving assisting;
under the condition that both of the third data processing processor and the fourth data processing processor stop operating, using at least one of the first data processing processor and the second data processing processor for the driving assisting; and
under the condition that the first through fourth data processing processors stop operating, using the processing control processor for the driving assisting.

9. The method of claim 8, wherein,
the first vehicle data is one or more of camera data, global navigation satellite system (GNSS) data, and inertial measurement unit (IMU) data;
the second vehicle data is one or more of USS interface data, millimeter-wave radar data, brake control unit (BCU) data and vehicle control unit (VCU) data;
the third vehicle data is vehicle gateway data; and
the fourth vehicle data is light detection and ranging (LiDAR) data.

10. The method of claim 8, further comprising:
communicating, by the third data processing processor, with a vehicle gateway via a first gateway; and
receiving, by the fourth data processing processor, the fourth vehicle data via a second gateway.

11. The method of claim 8, further comprising:
transmitting the first vehicle data through a gigabit serial multimedia link (GSML) de-serializer;
transmitting the second vehicle data over a vehicle controller area network (CAN); and
transmitting the third vehicle data and the fourth vehicle data over an Ethernet (ETH).

12. The method of claim 8, wherein,
the first data processing processor, the second data processing processor, the third data processing processor and the fourth data processing processor are system-on-chip (SoC) and communicate through peripheral component interconnect express (PCIe); and
the processing control processor is a micro control unit (MCU) or a domain control unit (DCU).

13. The method of claim 8, further comprising:
receiving, via the processing control processor, the second vehicle data by individual data processing processors in the data processing system.

14. The method of claim 8, further comprising:
storing one or more of the first through fourth vehicle data by a storage module.

15. A non-transitory computer readable storage medium having stored thereon program instructions executable by a processor that, when executed by the processor, perform the data processing method for driving assisting according to claim 8.

16. A vehicle comprising the data processing device for driving assisting according to claim 1.

* * * * *